(12) United States Patent
Ikeda

(10) Patent No.: US 10,979,586 B2
(45) Date of Patent: Apr. 13, 2021

(54) IMAGE FORMING APPARATUS, CONTROL METHOD OF IMAGE FORMING APPARATUS, AND STORAGE MEDIUM

(71) Applicant: CANON KABUSHIKI KAISHA, Tokyo (JP)

(72) Inventor: Atsushi Ikeda, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/222,856

(22) Filed: Dec. 17, 2018

(65) Prior Publication Data

US 2019/0191045 A1 Jun. 20, 2019

(30) Foreign Application Priority Data

Dec. 20, 2017 (JP) .............................. JP2017-244319

(51) Int. Cl.
*G06F 15/00* (2006.01)
*H04N 1/00* (2006.01)

(52) U.S. Cl.
CPC .............................. *H04N 1/00498* (2013.01)

(58) Field of Classification Search
CPC ................................................. H04N 1/00498
USPC ...................................................... 358/1.18
See application file for complete search history.

(56) References Cited

U.S. PATENT DOCUMENTS

| 6,530,028 B1* | 3/2003 | Yokoyama | G06F 1/26 704/8 |
| 2012/0010871 A1* | 1/2012 | Ichimi | G06F 9/454 704/8 |
| 2016/0065788 A1* | 3/2016 | Hosoda | H04N 1/4433 |

FOREIGN PATENT DOCUMENTS

| JP | 2001-088069 A | 4/2001 |
| JP | 2004-199343 A | 7/2004 |
| JP | 2005-205598 A | 8/2005 |
| JP | 2005-215285 A | 8/2005 |
| JP | 2006-015623 A | 1/2006 |
| JP | 2011-095970 A | 5/2011 |
| JP | 2013-109644 A | 6/2013 |
| JP | 2016-045822 A | 4/2016 |
| JP | 2016-137665 A | 8/2016 |
| JP | 2016-163939 A | 9/2016 |

\* cited by examiner

*Primary Examiner* — Mark R Milia
(74) *Attorney, Agent, or Firm* — Canon U.S.A., Inc. IP Division

(57) ABSTRACT

An image forming apparatus includes one or more processors, one or more memories for storing programs including an application configured to receive a setting relating to display candidates of a plurality of languages, the programs, when executed by the one or more processors, causing the image forming apparatus to perform a process for changing a display language, and a control unit configured to control processing such that the application transmits to firmware a changing request for changing a language displayed on a screen to a different language from among the display candidates of the plurality of languages when an instruction for changing a language displayed on the screen to a different language is received.

17 Claims, 13 Drawing Sheets

FIG.4

| DESTINATION | LANGUAGE LIST (RFC4646) |
|---|---|
| JP | ja, en, fr, it, de, es, ko, zh-cn, zh-tw |
| US | en, fr, it, de, es, pt, ja, ko, zh-cn, zh-tw |
| EU | en, fr, it, de, es, pt, nl, fi, no, sv, da, sl, cs, hu, ru, tr, el, et, ro, sk, hr, bg, ca, pl, lv, lt, ar, eu, ja, ko, zh-cn, zh-tw |
| AE | en, fr, it, de, es, pt, ja, ko, zh-cn, zh-tw, th, vi, ms |

| No. | LANGUAGE (RFC-4646) |
|---|---|
| 1 | ja |
| 2 | en |
| 3 | de |
| 4 | (empty) |
| 5 | (empty) |

9000

IMAGE FORMING APPARATUS, CONTROL METHOD OF IMAGE FORMING APPARATUS, AND STORAGE MEDIUM

BACKGROUND OF THE INVENTION

Field of the Invention

The present disclosure relates to an image forming apparatus, a control method of an image forming apparatus, and a storage medium.

Description of the Related Art

In some of the image forming apparatuses designed to be used worldwide, a user can select a display language on a screen from among a plurality of languages. In many cases, the language is selectable from among more than thirty languages.

In an environment in which one image forming apparatus is used by a plurality of employees of different nationalities, for example, a display language may be frequently changed by selecting two to five languages from among more than thirty languages.

In such a case, according to a technique discussed in Japanese Patent Application Laid-Open No. 2005-205598, a user can change a display language by operating a language-change key. Further, according to Japanese Patent Application Laid-Open No. 2005-205598, a button corresponding to the language-change key is provided on a liquid crystal panel, and a list of selectable languages is displayed when the button is selected, so that the user can select an optional display language.

Further, according to Japanese Patent Application Laid-Open No. 2011-95970, a user can cyclically change a display language from among a plurality of selectable languages by pressing a language key for a short time. Furthermore, according to Japanese Patent Application Laid-Open No. 2011-95970, a user can display a list of selectable languages to select an optional display language by pressing the language key for a long time.

However, in any of the above-described conventional techniques, the user has to select a desired display language from among more than thirty languages.

Further, in a case where the function for changing a display language is realized with embedded software, it can be difficult to flexibly change the operation specification according to a user environment.

SUMMARY OF THE INVENTION

According to various embodiments of the present disclosure, an image forming apparatus includes one or more processors, one or more memories for storing programs including an application configured to receive a setting relating to display candidates of a plurality of languages, the programs, when executed by the one or more processors, causing the image forming apparatus to perform a process for changing a display language, and a control unit configured to control processing such that the application transmits to firmware a changing request for changing a language displayed on a screen to a different language from among the display candidates of the plurality of languages when an instruction for changing a language displayed on the screen to a different language is received.

Further features will become apparent from the following description of exemplary embodiments with reference to the attached drawings.

BRIEF DESCRIPTION OF THE DRAWINGS

FIG. 4 is a table illustrating an example of a language list of each destination.

FIG. 8 is a table illustrating an example of a language-change setting.

DESCRIPTION OF THE EMBODIMENTS

Hereinafter, an exemplary embodiment will be described with reference to the appended drawings.

Figure 1:
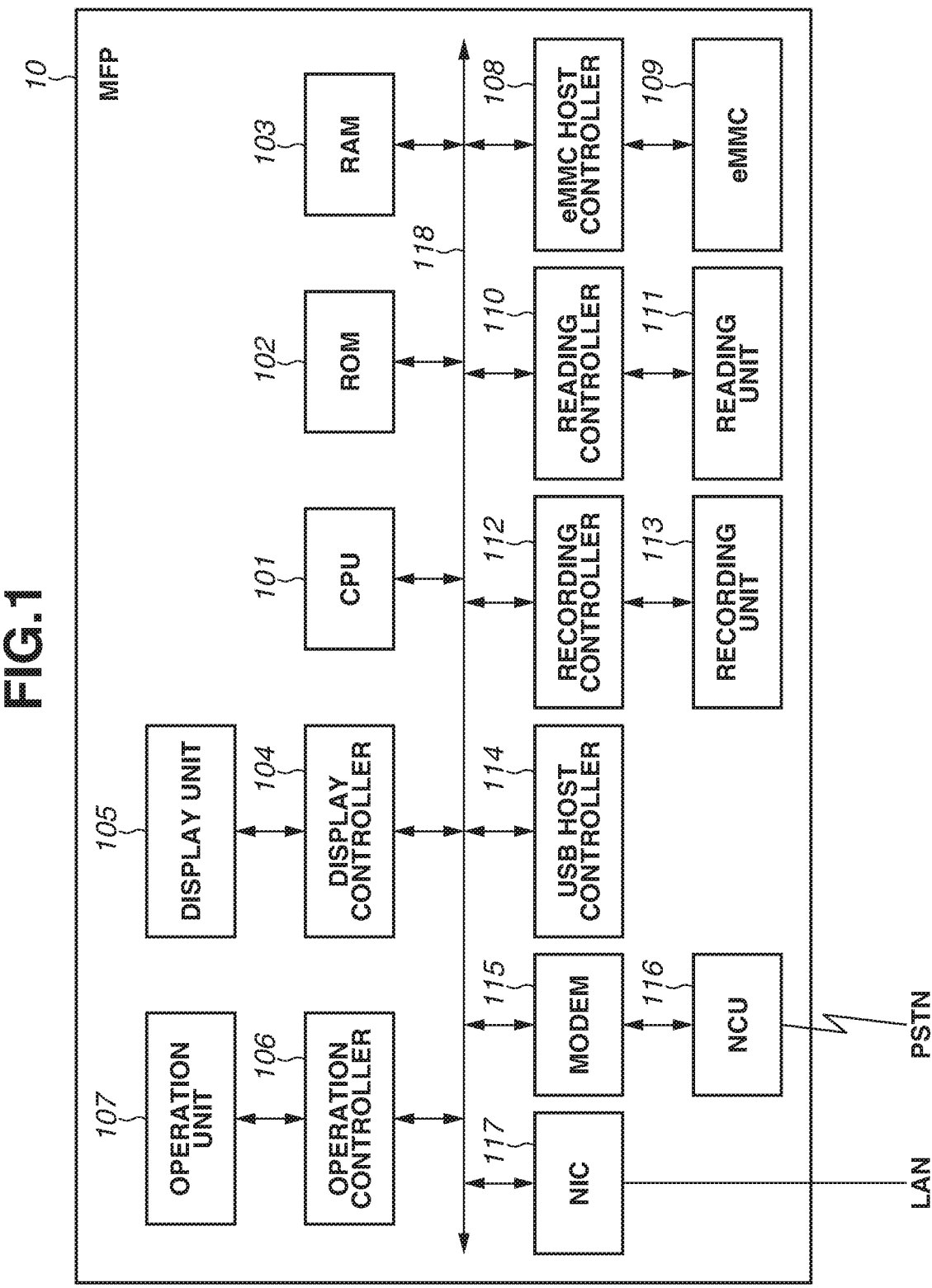
FIG. 1 is a block diagram illustrating an example of a hardware configuration of a multifunction peripheral (MFP).

A first exemplary embodiment will be described. FIG. 1 is a block diagram illustrating an example of a hardware configuration of a multifunction peripheral (MFP) 10.

As a hardware configuration, the MFP 10 includes a central processing unit (CPU) 101, a read only memory (ROM) 102, a random access memory (RAM) 103, a display controller 104, a display unit 105, an operation controller 106, an operation unit 107, an embedded multimedia card (eMMC) host controller 108, an eMMC 109, and a reading controller 110. Further, as a hardware configuration, the MFP 10 includes a reading unit 111, a recording controller 112, a recording unit 113, a universal serial bus (USB) host controller 114, a modulator-demodulator (modem) 115, a network control unit (NCU) 116, and a network interface card (NIC) 117.

The CPU 101 generally controls respective devices connected to a system bus 118. The CPU 101 executes a boot program stored in the ROM 102 when power is supplied thereto. Normally, based on the boot program, the CPU 101 loads a main program stored in a storage to the RAM 103, and the processing jumps to a beginning of the loaded main program. The RAM 103 functions not only as an area for loading the main program but also as a work area of the main program. The CPU 101 executes processing based on the main program, so that the below-described functional configuration of software in FIG. 2 and the below-described processing of the flowcharts in FIGS. 3, 5, 7, and 9 are realized.

The display controller 104 controls rendering with respect to the display unit 105. The display unit 105 is a full bitmap liquid crystal display (LCD) in a wide video graphics array (WVGA) size. On the other hand, the operation controller 106 controls an input received through the operation unit 107 provided on the MFP 10. The operation unit 107 is configured of a touch panel superimposed on the display unit 105.

The reading unit 111 reads a document. An auto-document feeder is mounted on the reading unit 111 as an optional, so that a plurality of documents can be automatically read. The reading unit 111 is connected to the reading controller 110. The CPU 101 exchanges data with the reading unit 111 via the reading controller 110.

The recording unit 113 forms an image on a recording sheet through an electrophotographic method. The recording unit 113 is connected to the recording controller 112. The CPU 101 exchanges data with the recording unit 113 via the recording controller 112.

The USB host controller 114 executes protocol control of a USB, and acts as an intermediary for an access between the MFP 10 and a USB device such as a USB memory.

The modem 115 executes modulation and demodulation of a signal necessary for executing facsimile communication. Further, the modem 115 is connected to the NCU 116. The signal modulated by the modem 115 is transmitted to a public switched telephone network (PSTN) via the NCU 116.

The NIC 117 bi-directionally transmits and receives data to/from a mail server or a file server via a local area network (LAN). Further, the NIC 117 bi-directionally transmits and receives data to/from a Web server.

The MFP 10 of the present exemplary embodiment includes the eMMC 109 as a storage. The CPU 101 accesses the eMMC 109 via the eMMC host controller 108.

Figure 2:
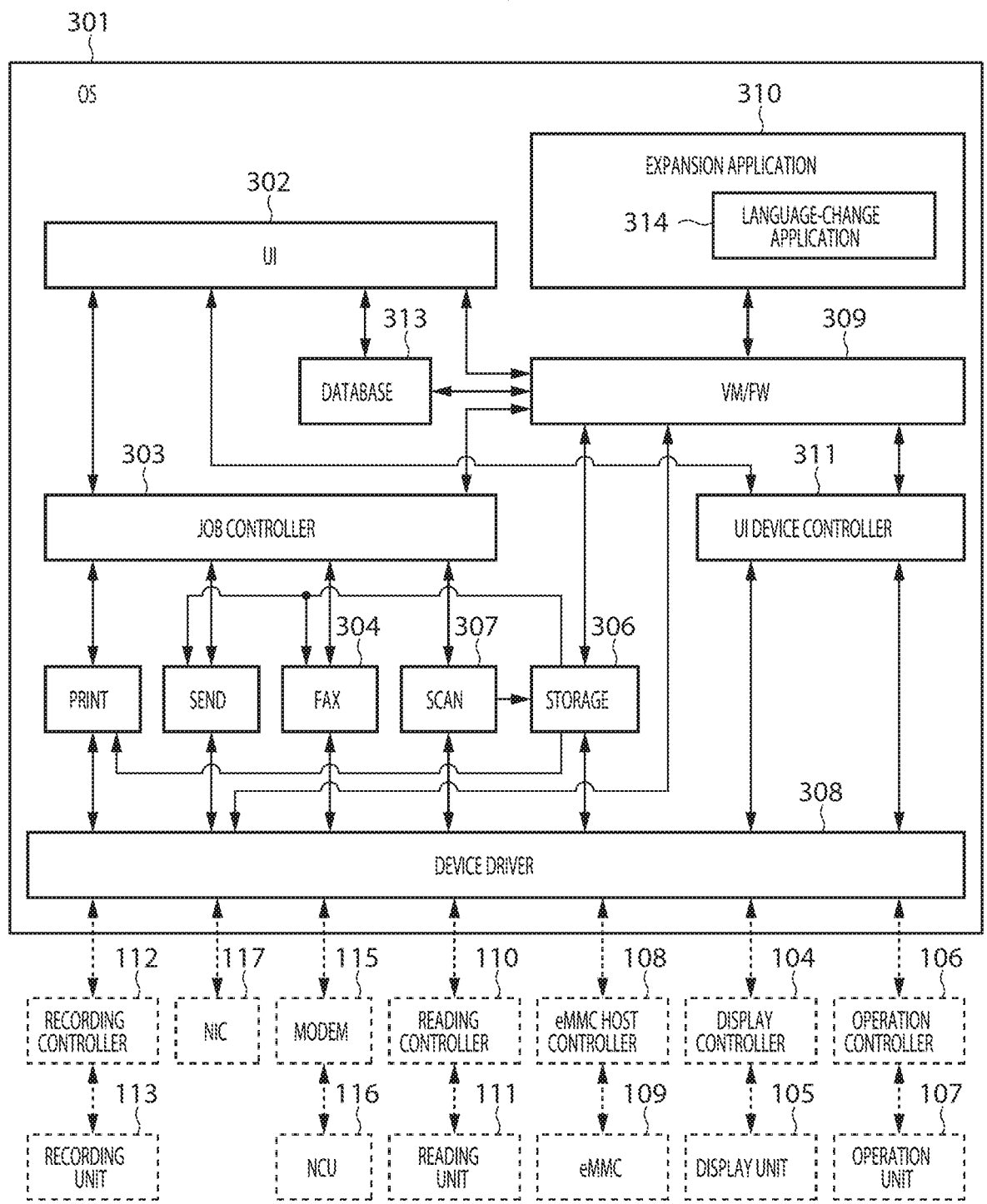
FIG. 2 is a block diagram illustrating an example of a functional configuration of software of the MFP.

FIG. 2 is a block diagram illustrating an example of a functional configuration of the software of the MFP 10. In FIG. 2, respective units expressed by a solid line are functional configurations of the software realized when the CPU 101 executes the main program loaded on the RAM 103 through the boot program.

An operating system (OS) 301 manages and controls execution of respective modules described below. A device driver 308 is combined with the OS 301. The device driver 308 acts as an intermediary which helps respective units to exchange data with the hardware devices such as the display controller 104, the operation controller 106 and the reading controller 110.

A user interface (UI) 302 provides various types of information to the user via the display unit 105 and the operation unit 107, and receives various instructions from the user. Various settings for changing the operation of the MFP 10 can also be changed through the UI 302. Various settings changed through the UI 302 are physically stored in the eMMC 109 via a database 313. A display language setting changed through the UI 302 is one of the various settings.

A job controller 303 receives a job such as a copy job, a print job, or a fax job, and controls execution of the received job.

A storage 306 is a software module which physically stores in the eMMC 109 data such as images transmitted or received via a facsimile or an application setting requested from an expansion application 310 and manages the data.

For example, in the MFP 10 of the present exemplary embodiment, when the job controller 303 receives a fax transmission job, a scan 307 receives the job request and controls the reading unit 111 to scan a document. Then, the scan 307 stores the scanned facsimile image data in the storage 306. The facsimile image data stored in the storage 306 is read by the fax 304 and transmitted to a sending destination via the modem 115 and the NCU 116 through facsimile transmission. Further, image data received from a transmission source through facsimile transmission via the modem 115 and the NCU 116 is fetched by the fax 304 and stored in the storage 306.

The MFP 10 of the present exemplary embodiment includes a virtual machine/framework (VM/FW) 309. The expansion application 310 is configured of a program described in a script language. For example, a language system such as Java (registered trademark) or Lua serving as an interpreter for analyzing and executing a byte code may be used. The VM/FW 309 plays a role of installing or uninstalling a program described in a script language or a predetermined high-level language to/from the expansion application 310. Further, the VM/FW 309 plays a role of making an adjustment between a function realized with a program installed in the expansion application 310 and an existing function. Then, the VM/FW 309 analyzes the described script language and executes the program. Through the above-described configuration, the MFP 10 of the present exemplary embodiment can easily realize a function such as a language-change application 314 while maintaining removability of the function. Furthermore, the VM/FW 309 receives a request from the program installed in the expansion application 310 to refer to or change various setting values stored in the database 313.

A UI device controller 311 acts as an intermediary which helps the UI 302 or the expansion application 310 to output various kinds of information to the display unit 105, or helps a user operation received via the operation unit 107 to be transmitted to the UI 302 or the expansion application 310.

Figure 3:
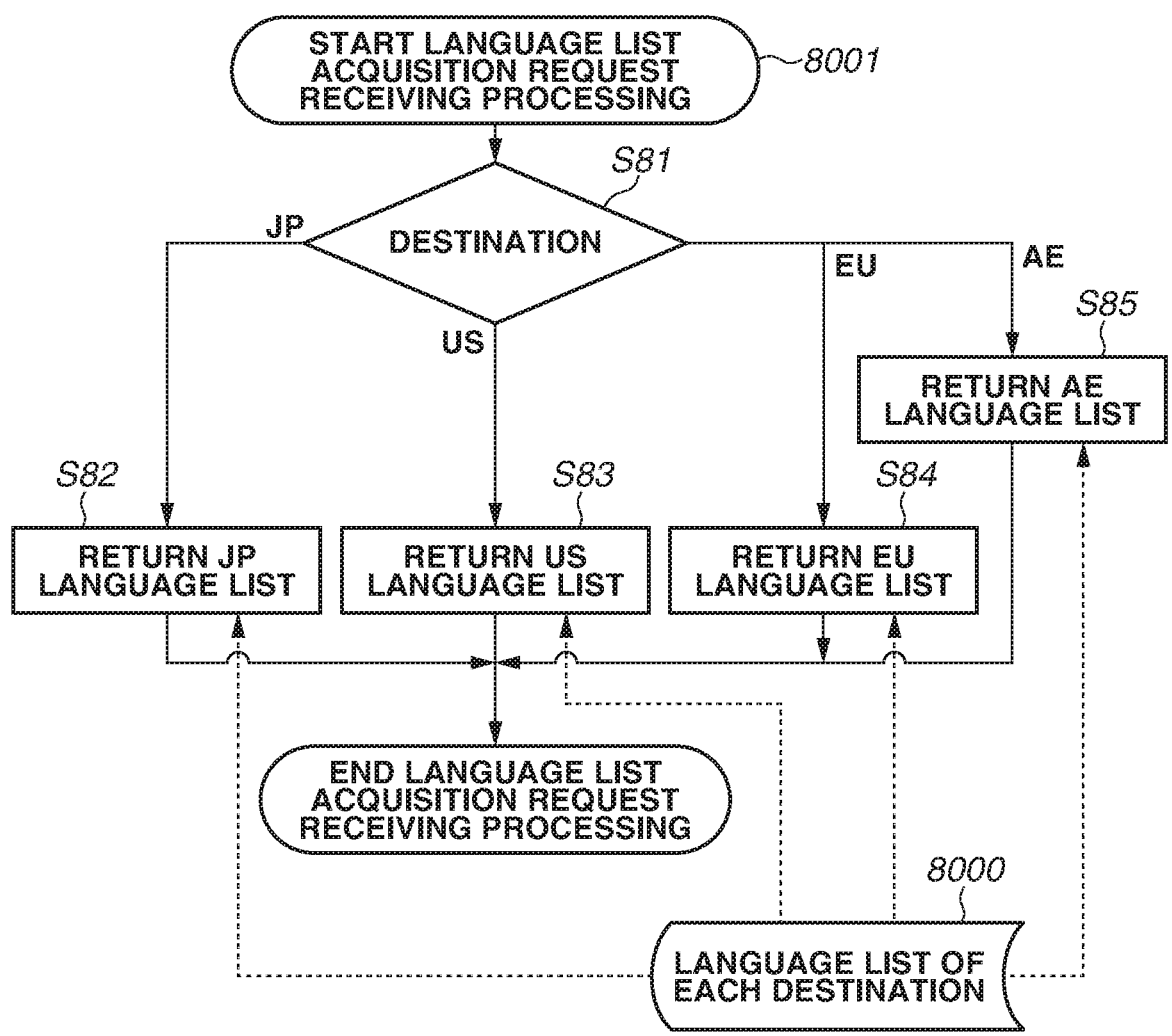
FIG. 3 is a flowchart illustrating a flow of language list acquisition request receiving processing.

FIG. 3 is a flowchart illustrating a flow of language list acquisition request receiving processing.

Herein, the receiving processing in FIG. 3 is a part of the processing constituting the VM/FW 309 in FIG. 2, executed by the CPU 101. Hereinafter, all of the processing described below is executed by the CPU 101.

The image forming apparatus of the present exemplary embodiment is manufactured such that the number of selectable languages is changed according to a sales territory (hereinafter, referred to as "destination"). A list of display languages selectable according to the destination is transmitted to an application through the language list acquisition request receiving processing in FIG. 3. Further, information about a destination is stored in the database 313 in FIG. 2 at the time of shipment from a factory, and cannot be rewritten by the user.

The language list acquisition request receiving processing 8001 in FIG. 3 is executed when an acquisition request of a language list is transmitted from the application installed in the expansion application 310.

First, in step S81, the VM/FW 309 determines a destination. According to the image forming apparatus of the present exemplary embodiment, four regions such as a Japanese region (JP), a North American region (US), a European region (EU), and an Asian region (AE) are settable as the destinations. According to the destination, the VM/FW 309 advances the processing to step S82 for the Japanese region (JP), step S83 for the North American region (US), step S84 for the European region (EU), or step S85 for the Asian region (AE).

In each of the steps S82 to S85, based on the language list 8000 of each destination, the VM/FW 309 returns a language list according to the destination to the application as a request source, and ends the language list acquisition request receiving processing. An example of the language list 8000 of each destination of the present exemplary embodiment is illustrated in FIG. 4. For example, if the destination is the Japanese region (JP), nine languages, i.e., Japanese, English, French, Italian, German, Spanish, Korean, Simplified Chinese, and Traditional Chinese are selectable.

Figure 5:
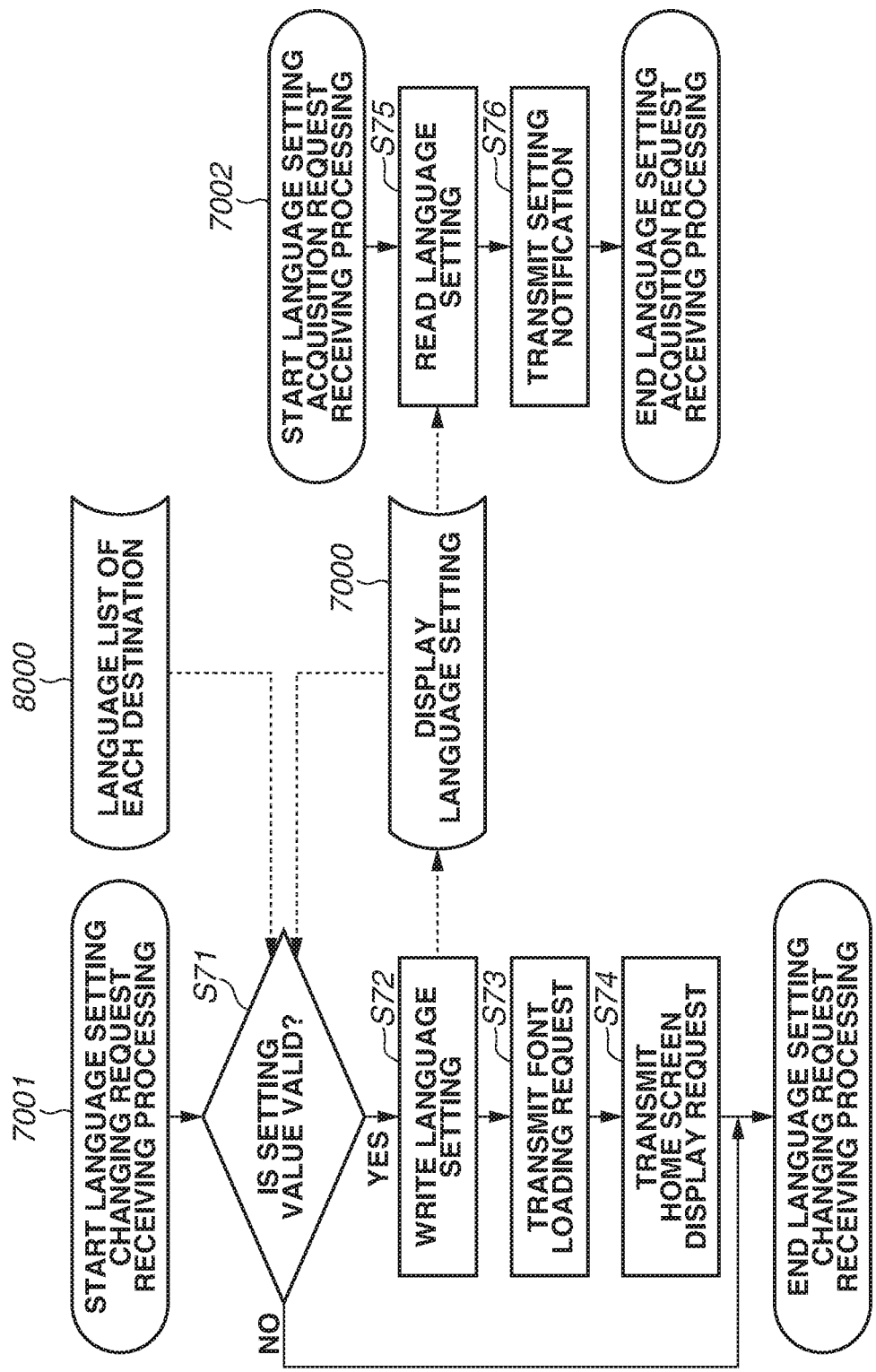
FIG. 5 is a flowchart illustrating a flow of request receiving processing.

FIG. 5 is a flowchart illustrating a flow of language setting changing request receiving processing and language setting acquisition request receiving processing. The language setting changing request is an example of the changing request.

Herein, respective pieces of receiving processing in FIG. 5 are a part of the processing constituting the VM/FW 309 in FIG. 2.

Language setting changing request receiving processing 7001 in FIG. 5 is executed when a language setting changing request is transmitted from an optional application installed in the expansion application 310.

First, in step S71, the VM/FW 309 determines whether a setting value specified by the optional application is valid. If the specified setting value is the same as the value of display language setting 7000, the language setting changing request receiving processing is ended because the value does not have to be changed. Further, based on the language list 8000 of each destination, the VM/FW 309 determines whether the specified setting value is included in the languages selectable for the current destination. If the specified setting value is not included (NO in step S71), the VM/FW 309 ends the language setting changing request receiving processing without executing the processing. If the setting value is valid (YES in step S71), the processing proceeds to step S72. Herein, the display language setting 7000 is allocated to the eMMC 109 via the database 313 in FIG. 2. Further, a display language setting of the UI 302 is also stored in the display language setting 7000 in addition to the language setting of an optional application. In other words, the display language setting 7000 is shared by the UI 302 and the optional application.

In step S72, the VM/FW 309 writes the specified setting value to the display language setting 7000.

Next, in step S73, the VM/FW 309 requests the UI 302 in FIG. 2 to load font data based on the display language setting 7000. The image forming apparatus of the present exemplary embodiment is a low-priced product, so that font data of all of the selectable languages cannot be loaded on the RAM 103 because a size of the RAM 103 in FIG. 1 is small. Therefore, the image forming apparatus of the present exemplary embodiment is configured to load font data of only a requisite minimum on the RAM 103 according to the display language setting. For example, when the language is changed from Japanese to English, the VM/FW 309 requests the UI 302 to load the English font data on the RAM 103. Therefore, the UI 302 loads the English font data on the RAM 103 based on the request. Similarly, when the language is changed from German to Japanese, the VM/FW 309 requests the UI 302 to load Japanese font data on the RAM 103. Therefore, the UI 302 loads the Japanese font data on the RAM 103 based on the request. However, the above-described configuration is not intended to limit the present exemplary embodiment, and English font data may be constantly loaded on the RAM 103. For example, when the language is changed from Japanese to Arabic when Japanese font data and English font data are loaded on the RAM 103, the VM/FW 309 may request the UI 302 to load Arabic font data on the RAM 103 instead of the Japanese font data. In this case, based on the request, the UI 302 loads the Arabic font data on the RAM 103 instead of the Japanese font data. As a result, the Arabic font data and the English font data are loaded on the RAM 103.

In step S73, the VM/FW 309 requests the UI 302 in FIG. 2 to update the font data.

Subsequently, in step S74, the VM/FW 309 requests the UI 302 in FIG. 2 to update display of the home screen based on the display language setting 7000, and ends the language setting changing request receiving processing. Herein, the home screen refers to a screen firstly displayed on the display unit 105 when the MFP 10 is used normally.

The UI 302 receives the request and executes loading of font data and update of the home screen based on the value stored in the display language setting 7000.

On the other hand, the language setting acquisition request receiving processing 7002 is executed when acquisition of the language setting is requested from an optional application installed in the expansion application 310.

First, in step S75, the VM/FW 309 reads a setting value from the display language setting 7000.

Next, in step S76, the VM/FW 309 notifies the read setting value to the optional application that transmits the acquisition request and ends the language setting acquisition request receiving processing.

Figure 6:
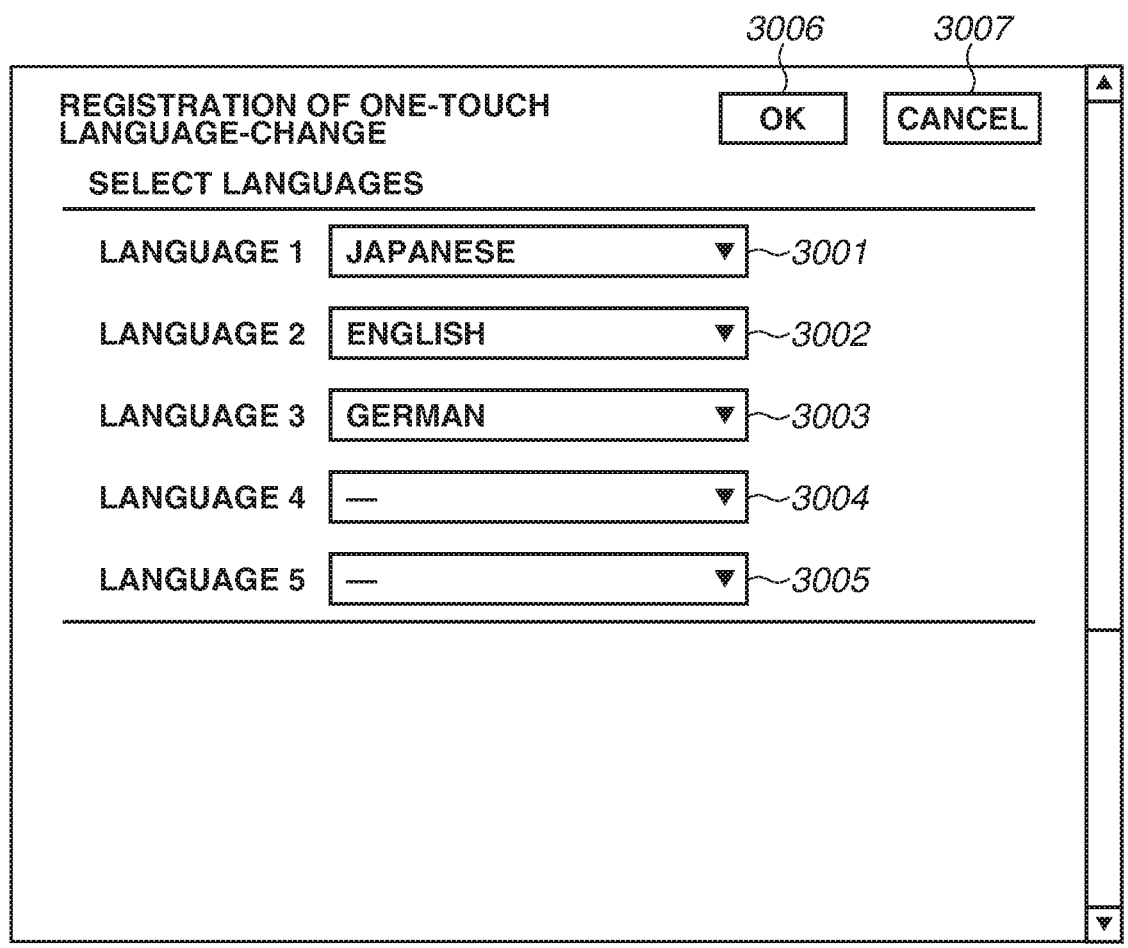
FIG. 6 is a diagram illustrating an example of a one-touch language-change registration screen.

FIG. 6 is a diagram illustrating an example of a one-touch language-change registration screen displayed on the web browser.

Figure 7:
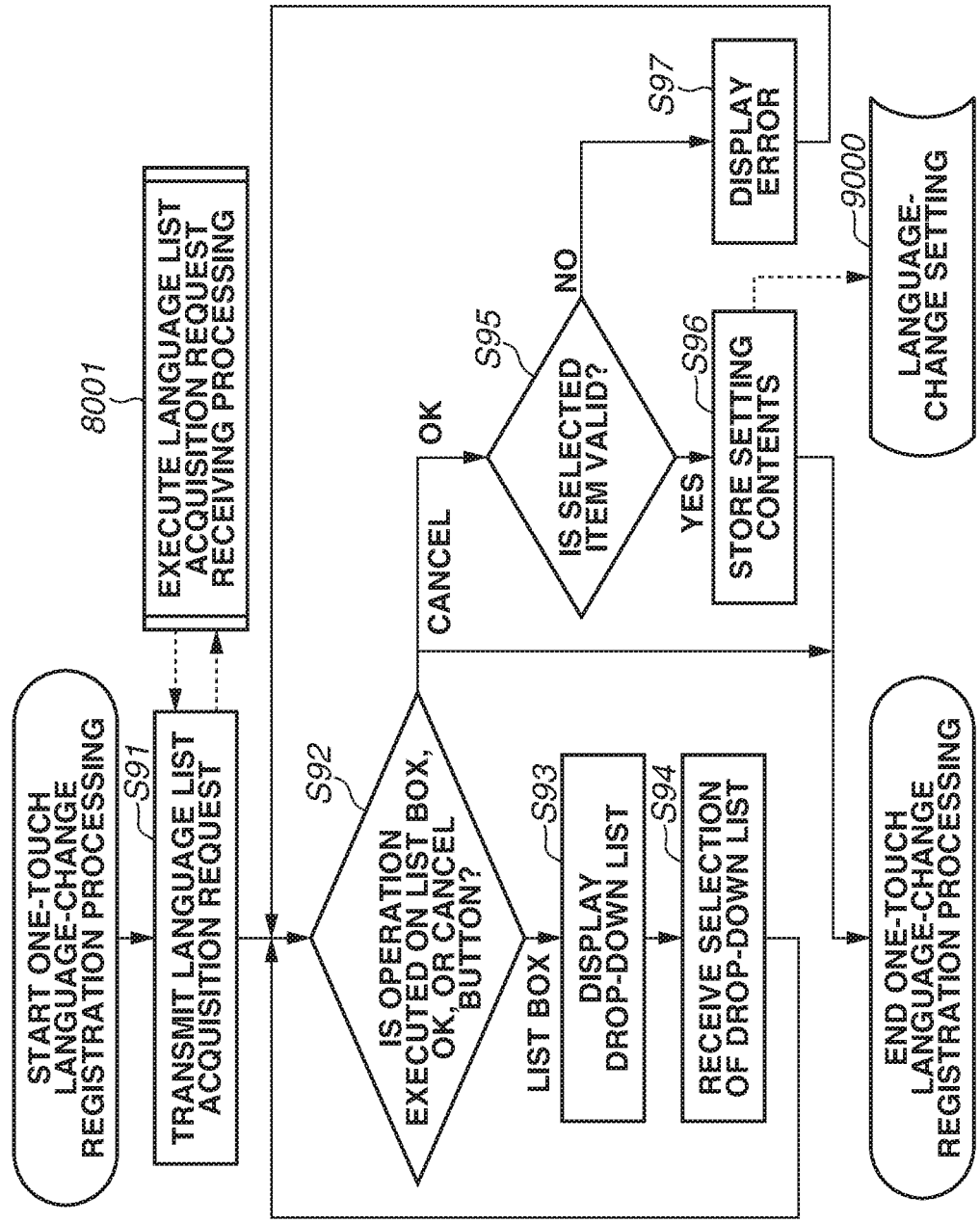
FIG. 7 is a flowchart illustrating a flow of one-touch language-change registration processing.

FIG. 7 is a flowchart illustrating a flow of one-touch language-change registration processing.

In addition, FIG. 8 is a table illustrating an example of the language-change setting.

The one-touch language-change registration will be described with reference to the respective drawings.

The one-touch language-change registration processing in FIG. 7 is executed through the HTTP servlet. The processing is called when the user accesses a predetermined URL through a web browser of a personal computer (PC). The registration processing is a part of the processing constituting the language-change application 314 installed in the expansion application 310.

First, in step S91, the language-change application 314 transmits a language list acquisition request. The VM/FW 309 receives the request, executes the language list acquisition request receiving processing 8001, and returns a list of selectable languages according to the destination to the language-change application 314.

In step S92, the language-change application 314 waits for a user operation. If the operation is performed with respect to list boxes 3001 to 3005 in FIG. 6 ("LIST BOX" in step S92), the processing proceeds to step S93. If an OK button 3006 is selected ("OK" in step S92), the processing proceeds to step S95. On the other hand, if a cancel button 3007 is selected ("CANCEL" in step S92), the language-change application 314 ends the one-touch language-change registration processing without executing the processing.

In step S93, the language-change application 314 displays a drop-down list. At this time, the language-change application 314 executes control of listing only selectable languages acquired in step S91.

In step S94, the language-change application 314 receives selection of the drop-down list, and the processing returns to step S92.

If the OK button 3006 is selected, in step S95, the language-change application 314 determines whether the contents selected for the list boxes 3001 to 3005 at that point in time are valid. If two or more languages are not selected, or selected languages are overlapped, or the list box without having a selected language is positioned between the list boxes having selected languages (e.g., languages are selected with respect to the languages 1 and 3, while a language is not selected with respect to the language 2), (NO in step S95), the processing proceeds to step S97. In step S97, the language-change application 314 displays an error message indicating that the selected contents are invalid, and the processing returns to step S92.

On the other hand, if the selected contents are valid (YES in step S95), the processing proceeds to step S96. In step S96, the language-change application 314 stores the selected contents in language-change setting 9000 and ends the one-touch language-change registration processing. Herein, the language-change setting 9000 is stored in the storage 306 in FIG. 2.

In FIGS. 6 and 8, Japanese, English, and German respectively are selected as the languages 1, 2, and 3, and languages are not selected for the languages 4 and 5.

When the one-touch language-change registration processing ends, a screen on the web browser is shifted to a screen of a predetermined URL.

Figure 9:
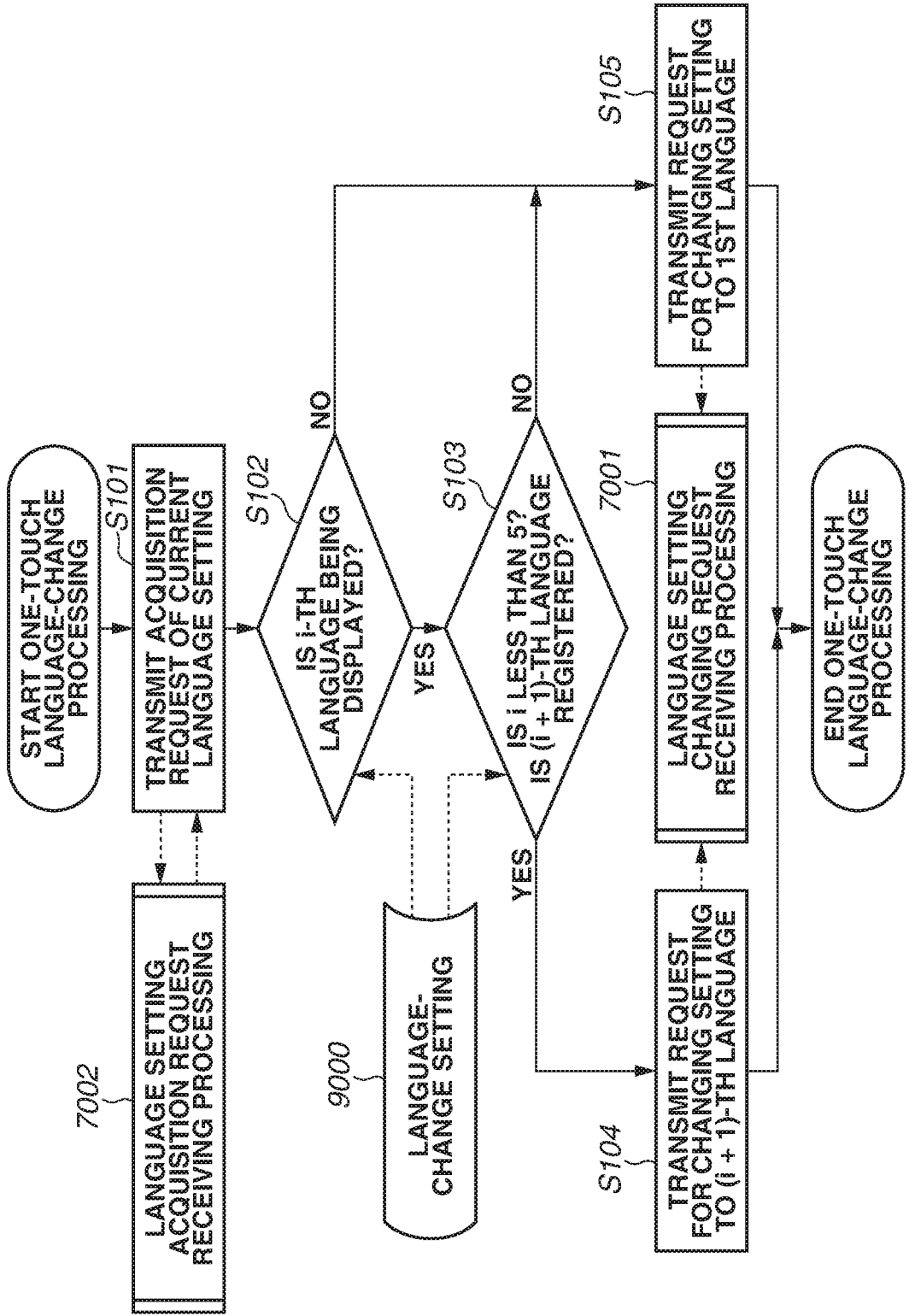
FIG. 9 is a flowchart illustrating a flow of one-touch language-change processing.

FIG. 9 is a flowchart illustrating a flow of one-touch language-change processing.

Figure 10:
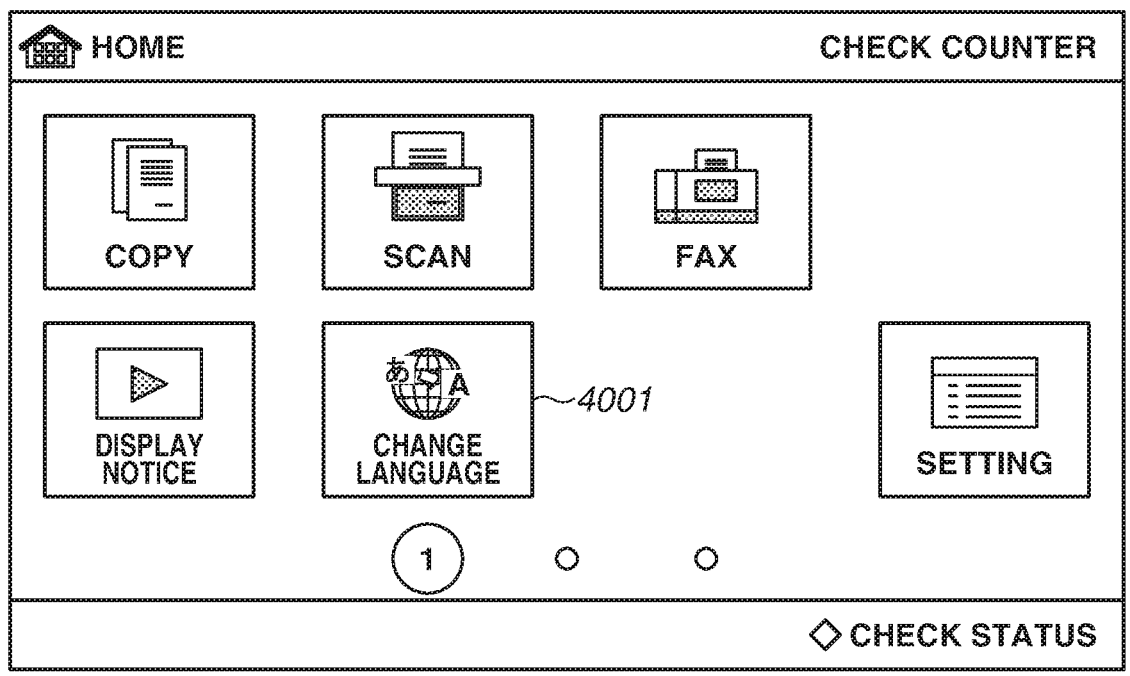
FIG. 10 is a diagram illustrating an example of a home screen.
Figure 11:
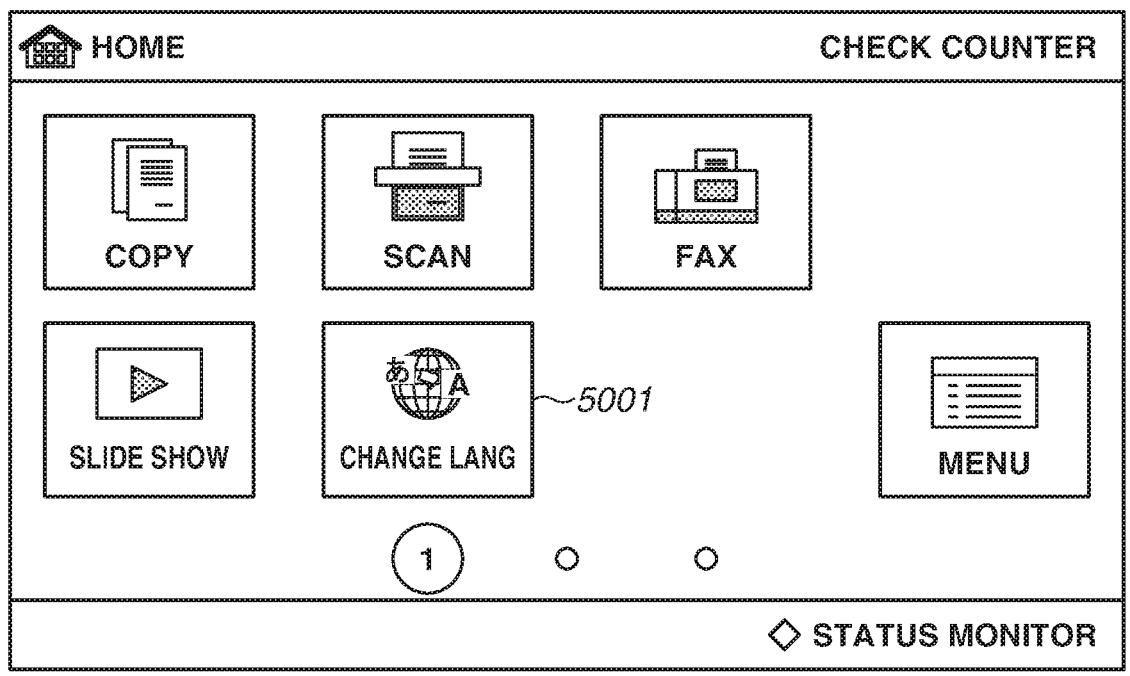
FIG. 11 is a diagram illustrating an example of a home screen.
Figure 12:
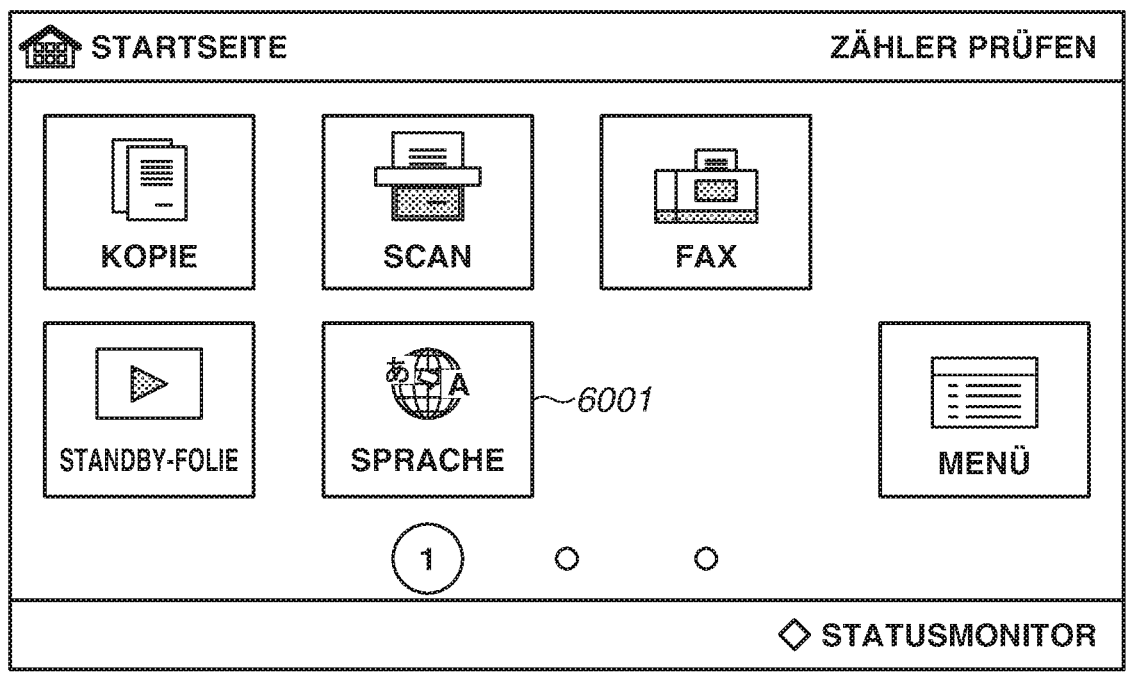
FIG. 12 is a diagram illustrating an example of a home screen.

Further, FIGS. 10, 11, and 12 are diagrams illustrating examples of the home screens to be displayed according to the selected languages.

The one-touch language-change will be described with reference to FIGS. 10 to 12. It is assumed that the contents in FIG. 8 are registered in the language-change setting 9000.

When the above-described one-touch language-change registration processing ends, a one-touch language-change button is displayed on the home screen according to the display language setting at that point in time. For example, if the display language is set as Japanese, as illustrated in FIG. 10, a button 4001 with a button name "language-change" is displayed on the home screen.

The one-touch language-change processing in FIG. 9 is called when the user selects the button 4001.

The one-touch language-change processing in FIG. 9 is a part of the processing constituting the language-change application 314 installed in the expansion application 310.

First, in step S101, the language-change application 314 transmits an acquisition request of the current language setting. The VM/FW 309 receives the request and executes the language setting acquisition request receiving processing 7002, and returns the current display language setting to the language-change application 314.

In step S102, the language-change application 314 determines whether the current display language is the i-th language registered in the language-change setting 9000. If the current display language is the i-th language (YES in step S102), the processing proceeds to step S103. If the current display language is not the i-th language (NO in step S102), the processing proceeds to step S105. For example, if the screen in FIG. 10 is displayed, the display language conforms to the first language in the table in FIG. 8.

In step S103, the language-change application 314 determines whether a value "i" is less than 5 (i<5), and also determines whether the (i+1)-th language is registered. If the value "i" is less than 5, and the (i+1)-th language is registered (YES in step S103), the processing proceeds to step S104. If the above-described condition is determined to be false (NO in step S103), the processing proceeds to step S105. For example, if the screen in FIG. 10 is displayed, the processing proceeds to step S104.

In step S104, the language-change application 314 transmits a request for changing a setting of the language to the (i+1)-th registered language. The VM/FW 309 receives the request and executes the language setting changing request receiving processing 7001. As a result, the display language setting is changed to the specified language. Then, font of the specified language is loaded, so that the display language of the home screen is changed to the specified language. For example, if the Japanese screen in FIG. 10 is displayed, the screen is changed to the English screen in FIG. 11 when the button 4001 is selected. If the English screen in FIG. 11 is displayed, the screen is changed to the German screen in FIG. 12 when a button 5001 is selected.

On the other hand, if the language-change application 314 determines that the i-th language is not displayed in step S102, or determines that the condition is false in step S103, in step S105, the language-change application 314 transmits a request for changing a setting of the language to the first registered language. The VM/FW 309 receives the request and executes the language setting changing request receiving processing 7001. As a result, the setting of the display language is changed to the first language. For example, if the German screen in FIG. 12 is displayed, the screen is changed to the Japanese screen in FIG. 10 when a button 6001 is selected. If the user selects a language that is not registered in the language-change setting 9000 from the existing display language changing menu without using the one-touch language-change function, the Japanese screen in FIG. 10 is displayed when the user selects a button corresponding to the button 4001, 5001, or 6001. Herein, a button name according to the display language setting at that point in time is described in the button corresponding to the button 4001, 5001, or 6001. Each of the buttons 4001, 5001, and 6001 is an example of the object. The language corresponding to the button 4001 is Japanese. The language corresponding to the button 5001 is English. The language corresponding to the button 6001 is German.

As a result, for example, if the contents described in FIG. 8 are registered in the language-change setting 9000, Japanese, English, and German can be cyclically changed by selecting the button 4001, 5001, or 6001.

As described above, by previously selecting two or more and five or less languages from among more than thirty languages, selected languages can be cyclically changed. In comparison to the case where one language is selected from among more than 30 languages, the language can be easily changed.

Further, font data is updated when the language changing request is received. With this configuration, even if the image forming apparatus is a low-priced product which cannot load font data of all of the languages on the RAM space, the display language can be changed according to the language changing request from the application.

In addition, a list of selectable languages according to the destination can be notified to the application. With this configuration, a language-change application can be created without taking a destination into consideration. Therefore, a similar function can be provided through a common application with respect to a plurality of image forming apparatuses which provide different numbers of changeable languages.

Variation Example

Figure 13:
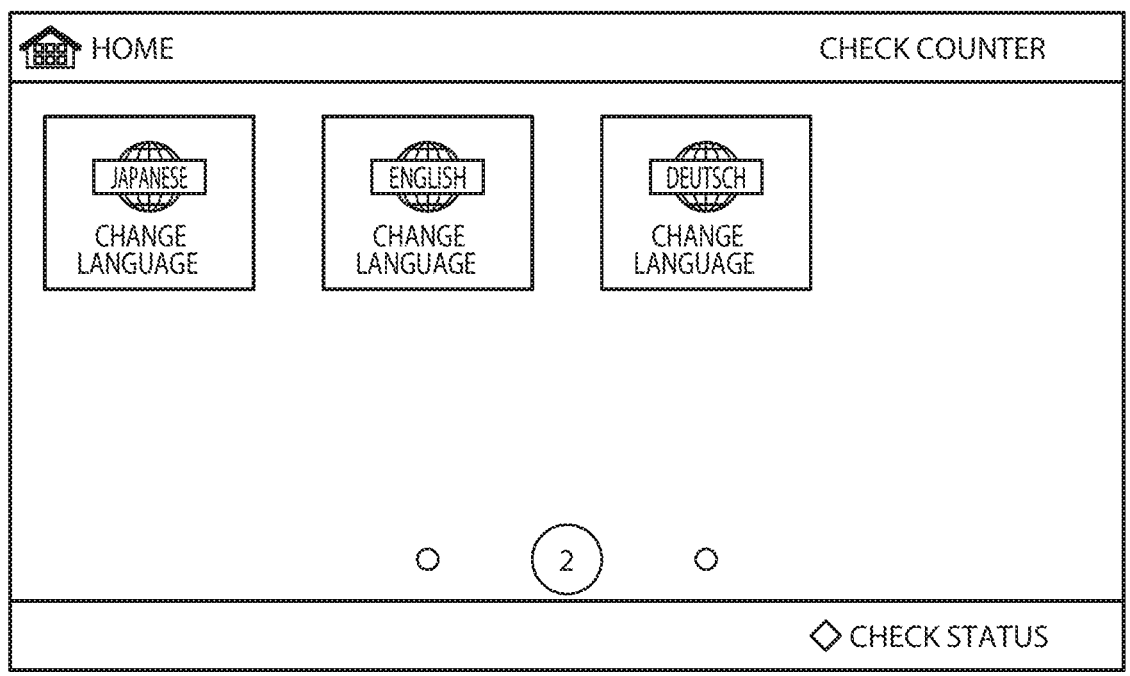
FIG. 13 is a diagram illustrating an example of a home screen.

In the first exemplary embodiment, the display language can be cyclically changed by selecting the buttons in FIGS. 10 to 12. However, this is one implementation of the application, and a similar effect can be acquired through another implementation of the application if the image forming apparatus has the function described in the first exemplary embodiment. In other words, a system having flexibility to allow modification of the operation specifications can be secured. For example, as illustrated in FIG. 13, the application may be implemented so that buttons of all of the languages selected in FIG. 6 are displayed on the home screen instead of the buttons in FIGS. 10 to 12. FIG. 13 is a diagram illustrating a state where the contents in FIG. 8 are registered in the language-change setting 9000. If five languages are registered, five buttons will be displayed on the home screen. Further, in FIG. 13, respective names of the languages selected in FIG. 6 are described in corresponding languages on the icons of buttons. With this configuration, the user can easily recognize a relationship between the buttons and the languages. Naturally, the contents expressed in the icon do not have direct influence on the effect of the present exemplary embodiment. Further, with this configuration, the effect of the present exemplary embodiment can be acquired even if the application does not request acquisition of the current language setting. Furthermore, the image forming apparatus does not have to have a function for returning the current language setting in response to the request from the application.

Further, in the first exemplary embodiment, the application is configured such that two or more and five or less display languages are previously selectable. However, there is no direct relationship between the essential spirit of the present exemplary embodiment and the number of languages previously selectable through the application. For example, the lower limit number thereof may be three or more, and a similar effect can be acquired as long as the upper limit number thereof is less than the number of entire languages.

In the first exemplary embodiment, font data is updated when the language changing request is received. However, even if the image forming apparatus does not have the above-described function, a similar effect can be acquired if the image forming apparatus can load font data of all of languages on a RAM.

Further, in the first exemplary embodiment, a method of returning a list of selectable languages according to the destination to the application has been described by taking the image forming apparatus expected to be shipped to any one of four destinations as an example. However, the number of destinations does not have to be four. Even if all of the languages provided by the image forming apparatus are selectable in any destination, a similar function can be provided through a common application if the image forming apparatus has a function for notifying the list of selectable languages.

According to various embodiments of the present disclosure, it is possible to easily change the display language through a simple operation while securing flexibility to allow modification of operation specifications.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While various embodiments have been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-244319, filed Dec. 20, 2017, which is hereby incorporated by reference herein in its entirety.

What is claimed is:

1. An image forming apparatus having a display, wherein an application for changing a display language for the display is installed on the image forming apparatus, the image forming apparatus comprising:
one or more memories storing instructions; and
one or more processors which execute the instructions and cause the image forming apparatus to function as:
a display control unit configured to cause the display to display a first object relating to a copy operation and a second object for changing the language to be displayed on the display,
wherein the display control unit changes, in response to a first one-touch operation of the second object, the language in which the first object and the second object are displayed on the display, from a first language to a second language, and then the display control unit changes, in response to a second one-touch operation of the second object, the language in which the first object and the second object are displayed on the display, from the second language,
wherein the one or more memories store at least a plurality of languages corresponding to a first region and a plurality of languages corresponding to a second region, and
wherein the application acquires, from the one or more memories, a plurality of languages corresponding to region information of the image forming apparatus, and wherein the first language and the second language are selected from the acquired plurality of languages.

2. The image forming apparatus according to claim 1, wherein the display control unit causes the display to further display a third object relating to a scan operation together with the first object relating to the copy operation and the second object for changing the language to be displayed on the display, wherein the display control unit changes, in response to the first one-touch operation of the second object, the language in which the third object is displayed on the display, from the first language to the second language.

3. The image forming apparatus according to claim 1, wherein the display control unit causes the touch panel to further display a third object relating to a facsimile operation together with the first object relating to the copy operation and the second object for changing the language to be displayed on the display, wherein the display control unit changes, in response to the first one-touch operation of the second object, the language in which the third object is displayed on the display, from the first language to the second language.

4. The image forming apparatus according to claim 1, wherein the display control unit loads a font of the second language and causes the display to display the first object and the second object in the second language in response to the first one-touch operation of the second object.

5. The image forming apparatus according to claim 1, wherein the display control unit causes a home screen to display the first object and the second object.

6. The image forming apparatus according to claim 1, wherein the first language and the second language are registered using a web browser of a computer from among a plurality of languages.

7. The image forming apparatus according to claim 1, wherein the region information of the image forming apparatus is stored in the one or more memories and the image forming apparatus identifies, based on the region information, the plurality of languages to be acquired from among the stored languages.

8. The image forming apparatus according to claim 1, wherein the display is a touch panel.

9. The image forming apparatus according to claim 1, wherein the region information of the image forming apparatus is a sales region of the image forming apparatus.

10. A control method of an image forming apparatus having a display, wherein an application for changing a display language for the display is installed on the image forming apparatus, the control method comprising:
    causing the display to display a first object relating to a copy operation and a second object for changing the language to be displayed on the display,
    wherein the image forming apparatus changes, in response to a first one-touch operation of the second object, the language in which the first object and the second object are displayed on the display, from a first language to a second language, and then the display control unit changes, in response to a second one-touch operation of the second object, the language in which the first object and the second object are displayed on the display, from the second language,
    wherein one or more memories store at least a plurality of languages corresponding to a first region and a plurality of languages corresponding to a second region, and
    wherein the application acquires, from the one or more memories, a plurality of languages corresponding to region information of the image forming apparatus, and wherein the first language and the second language are selected from the acquired plurality of languages.

11. The control method according to claim 10, wherein the image forming apparatus causes a home screen to display the first object and the second object.

12. The control method according to claim 10, further comprising:
    causing the display to further display a third object relating to a scan operation together with the first object relating to the copy operation and the second object for changing the language to be displayed on the display, wherein, in response to the first one-touch operation of the second object, the language in which the third object is displayed on the display, is changed from the first language to the second language.

13. The control method according to claim 10, further comprising:
    causing the display to further display a third object relating to a facsimile operation together with the first object relating to the copy operation and the second object for changing the language to be displayed on the display, wherein, in response to the first one-touch operation of the second object, the language in which the third object is displayed on the display, is changed from the first language to the second language.

14. The control method according to claim 10, further comprising:
    loading a font of the second language and causing the display to display the first object and the second object in the second language in response to the first one-touch operation of the second object.

15. The control method according to claim 10, wherein the first language and the second language are registered using a web browser of a computer from among a plurality of languages.

16. The control method according to claim 10, wherein the region information of the image forming apparatus is stored in the one or more memories and the image forming apparatus identifies, based on the region information, the plurality of languages to be acquired from among the stored languages.

17. The control method according to claim 10, wherein the region information of the image forming apparatus is a sales region of the image forming apparatus.

* * * * *